US010038647B1

(12) United States Patent
Lesea

(10) Patent No.: US 10,038,647 B1
(45) Date of Patent: Jul. 31, 2018

(54) CIRCUIT FOR AND METHOD OF ROUTING DATA BETWEEN DIE OF AN INTEGRATED CIRCUIT

(71) Applicant: Xilinx, Inc., San Jose, CA (US)

(72) Inventor: Austin H. Lesea, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 125 days.

(21) Appl. No.: 15/154,892

(22) Filed: May 13, 2016

(51) Int. Cl.
*H04L 12/933* (2013.01)
*H04L 25/02* (2006.01)

(52) U.S. Cl.
CPC ........ *H04L 49/109* (2013.01); *H04L 25/0272* (2013.01); *H04L 49/15* (2013.01)

(58) Field of Classification Search
CPC .... H04L 49/109; H04L 49/15; H04L 25/0272
USPC ......................................... 370/359
See application file for complete search history.

(56) References Cited

U.S. PATENT DOCUMENTS

| | | | |
|---|---|---|---|
| 5,671,032 A * | 9/1997 | Lee ................... | G02F 1/133345 349/122 |
| 6,353,334 B1 | 3/2002 | Schultz et al. | |
| 6,774,666 B1 | 8/2004 | Samad | |
| 6,784,824 B1 | 8/2004 | Quinn | |
| 6,927,608 B1 | 8/2005 | Chen et al. | |
| 6,932,618 B1 | 8/2005 | Nelson | |
| 6,963,219 B1 | 11/2005 | Ghia et al. | |
| 6,975,132 B2 | 12/2005 | Groen et al. | |
| 7,057,413 B1 | 6/2006 | Young et al. | |
| 7,071,756 B1 | 7/2006 | Vadi et al. | |
| 7,142,033 B2 | 11/2006 | Ghia et al. | |
| 7,145,362 B1 | 12/2006 | Bergendahl et al. | |
| 7,265,586 B1 | 9/2007 | Zhou et al. | |
| 7,315,220 B1 | 1/2008 | Robinson et al. | |
| 7,372,299 B2 | 5/2008 | Vadi et al. | |
| 7,436,216 B1 | 10/2008 | Brunn et al. | |
| 7,454,658 B1 | 11/2008 | Baxter | |
| 7,460,586 B1 | 12/2008 | Gaboury et al. | |
| 7,479,805 B1 | 1/2009 | Zhou et al. | |
| 7,480,347 B2 | 1/2009 | Black et al. | |
| 7,546,408 B1 | 6/2009 | Donlin et al. | |
| 7,650,248 B1 | 1/2010 | Baxter | |
| 7,724,815 B1 | 5/2010 | Raha et al. | |
| 7,786,762 B2 | 8/2010 | Ballantyne et al. | |
| 7,830,985 B2 | 11/2010 | Black et al. | |
| 8,030,967 B1 | 10/2011 | Tan et al. | |
| 8,134,813 B2 | 3/2012 | Karp et al. | |

(Continued)

OTHER PUBLICATIONS

Lattice Semicondutor Corporation, "Differential Signaling", Application Note AN6019, May 2001, 4 pages, San Jose, USA.

(Continued)

*Primary Examiner* — Stephen J Clawson
(74) *Attorney, Agent, or Firm* — John J. King

(57) ABSTRACT

A circuit for routing data between die of an integrated circuit is described. The circuit comprises differential transmitter and receiver pairs of different integrated circuit die that are coupled together by differential transmission lines. A separate differential transmitter associated with the first die of the integrated circuit and a separate differential receiver associated with the second die of the integrated circuit are configured to transmit data day way of the differential transmission lines associated with the differential transmitter and receiver pairs.

20 Claims, 8 Drawing Sheets

(56) References Cited

U.S. PATENT DOCUMENTS

| | | | |
|---|---|---|---|
| 8,346,658 B1 | 1/2013 | Curry et al. | |
| 8,358,156 B1 | 1/2013 | Abugharbieh et al. | |
| 8,536,935 B1 | 9/2013 | LeBoeuf et al. | |
| 8,836,409 B1 | 9/2014 | Cullen et al. | |
| 9,178,503 B2 | 11/2015 | Hsieh | |
| 2006/0132424 A1* | 6/2006 | Foo | G02F 1/13318 345/102 |
| 2010/0066404 A1* | 3/2010 | Zhang | H03K 19/0005 326/30 |
| 2012/0249472 A1* | 10/2012 | Hong | G06F 3/045 345/174 |
| 2014/0070380 A1 | 3/2014 | Chiu et al. | |

OTHER PUBLICATIONS

Poulton, John W., et al., "Multiwire Differential Signaling", Revision 1.1, Aug. 6, 2003, 20 pp., UNC-CH Department of Computer Science, Chapel Hill, USA.

Tolentino, Darwin et al., "Versatile, Precision Single-Ended-to-Differential Signal Conversion Circuit with Adjustable Dutput Common Mode Boosts System Dynamic Range", Nov. 2-015, 3 pp., Analog Dialogue 49-11, Analog Devices, San Jose, USA.

\* cited by examiner

CIRCUIT FOR AND METHOD OF ROUTING DATA BETWEEN DIE OF AN INTEGRATED CIRCUIT

FIELD OF THE INVENTION

The present invention relates generally to integrated circuit devices, and in particular, to a circuit for and a method of routing data between die of an integrated circuit.

BACKGROUND OF THE INVENTION

Integrated circuits are important elements of many electronic devices. As with many other elements of electronic devices, efforts are continuously made to increase the functionality while reducing the size of an integrated circuit package. In order to increase the functionality of a given integrated circuit package, multi-chip modules having a number of die have been implemented. Such multi-chip modules may receive the multiple die on the substrate, or may include an interposer on the substrate that receives the multiple die.

Data transmission is an important aspect of integrated circuit devices. In order to transmit a large amount of data, it may be necessary to provide a large number of output pads or contacts of an integrated circuit die to accommodate the data. The large number of output pads or contacts increases the size of the integrated circuit device.

Accordingly, circuits and methods that enable the routing of differential data between die with a reduced number of contacts are beneficial.

SUMMARY OF THE INVENTION

A circuit for routing data between die of an integrated circuit is described. The circuit comprises a first differential transmitter and receiver pair having a first differential transmitter associated with a first die of the integrated circuit and a first differential receiver associated with a second die of the integrated circuit, wherein the first differential transmitter has a first output resistor divider coupled between a first output and a second output and the first differential receiver has a first input resistor divider coupled between a first input and a second input; a first differential transmission line coupled between the first differential transmitter and the first differential receiver; a second differential transmitter and receiver pair having a second differential transmitter associated with the first die of the integrated circuit and a second differential receiver associated with the second die of the integrated circuit, wherein the second differential transmitter has a second output resistor divider coupled between a third output and a fourth output and the second differential receiver has a second input resistor divider coupled between a third input and a fourth input; a second differential transmission line coupled between the second differential transmitter and the second differential receiver; a third differential transmitter associated with the first die of the integrated circuit, the third differential transmitter having a fifth transmitter output coupled to a node of the first output resistor divider and a sixth transmitter output coupled to a node of the second output resistor divider; and a third differential receiver associated with the second die of the integrated circuit, the third differential receiver having a fifth receiver input coupled to a node of the first input resistor divider and a sixth receiver input coupled to a node of the second input resistor divider.

A method of routing data between die of an integrated circuit is described. The method comprises coupling a first output resistor divider between a first output and a second output of a first differential transmitter; coupling a first input resistor divider of a first differential receiver between a first input and a second input; configuring a first differential transmission line between the first differential transmitter and the first differential receiver; coupling a second output resistor divider of a second differential transmitter between a third output and a fourth output; coupling a second input resistor divider of a second differential receiver between a third input and a fourth input; configuring a second differential transmission line between the second differential transmitter and the second differential receiver; implementing a third differential transmitter associated with the first die of the integrated circuit, the third differential transmitter having a fifth transmitter output coupled to a node of the first output resistor divider and a sixth transmitter output coupled to a node of the second output resistor divider; and implementing a third differential receiver associated with the second die of the integrated circuit, the third differential receiver having a fifth receiver input coupled to a node of the first input resistor divider and a sixth receiver input coupled to a node of the second input resistor divider.

Other features will be recognized from consideration of the Detailed Description and the Claims, which follow.

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The circuits and methods set forth below uses an implementation of differential pairs to reduce the number of die-to-die connections, and therefore reduce the size of an integrated circuit device. The circuits and methods enable the transfer of data at a rate greater than 10 Gb/s per channel.

Figure 1:
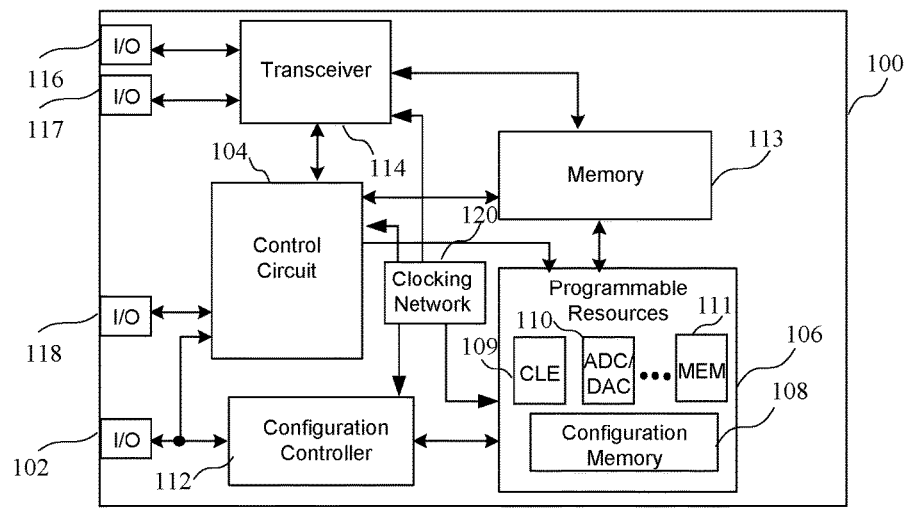
FIG. 1 is a block diagram of an integrated circuit comprising a circuit for routing data in the integrated circuit.

Turning first to FIG. 1, a block diagram of an integrated circuit 100 comprising a circuit for routing data in the integrated circuit is shown. In particular, an input/output port 102 is coupled to a control circuit 104 that controls programmable resources 106 having configuration memory 108 having configurable logic elements 109, analog-to-digital (ADC) and digital-to-analog (DAC) circuit 110, and memory 111. Configuration data may be provided to the configuration memory 108 by a configuration controller 112. The configuration data enables the operation of the programmable resources 106. A memory 113 may be coupled to the control circuit 104 and the programmable resources 106. A transceiver circuit 114 may be coupled to the control circuit 104, programmable resources 106 and the memory 113, and may receive signals at the integrated circuit by way of I/O ports 116 and 117. It should be noted that the transceiver circuit 114 comprises a plurality of differential receivers and differential transmitters, as described in more detail in the remaining figures. Other I/O ports may be coupled to circuits of the integrated circuit device, such as I/O port 118 that is coupled to the control circuit 104 as shown. A clocking network 120 is coupled to various elements of the circuit of FIG. 1.

Figure 2:
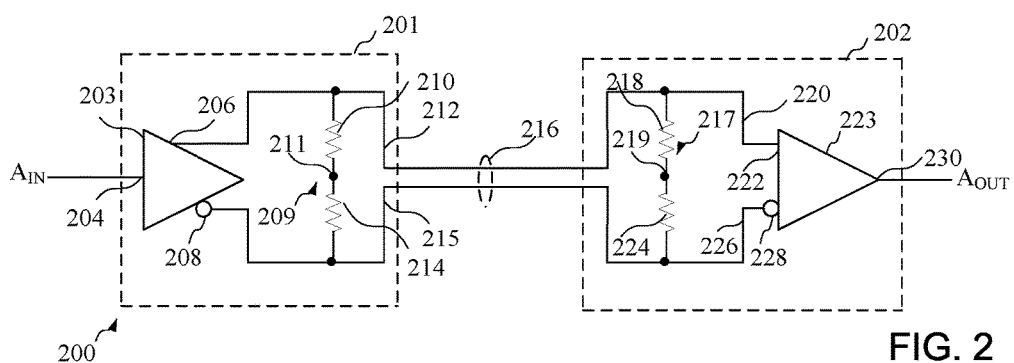
FIG. 2 is a block diagram of a differential pair signal line coupled between a differential transmitter and a differential receiver of a differential transmitter and receiver pair.

Turning now to FIG. 2, a block diagram of a differential pair signal line coupled between a differential transmitter and a differential receiver of a differential transmitter and receiver pair is shown. In particular, the differential transmitter and receiver pair 200 comprises a differential transmitter 201 and a differential receiver 202. The differential transmitter 201 comprises a differential amplifier 203 having an input 204 for receiving an input signal $A_{IN}$. A differential output signal based upon the input signal is generated at a pair of differential outputs 206 and 208. An output resistor divider 209 is coupled between the differential outputs 206 and 208, and comprises a first resistor 210 coupled between a node 211 and a first output line 212 and a second resistor 214 coupled between the node 211 and a second output line 215.

The differential transmitter 201 is coupled to the differential receiver 202 by differential transmission line 216. The differential receiver 202 comprises an input resistor divider 217 having a first resistor 218 coupled between a node 219 and an input line 220 coupled to an input 222 of a receiver 223, and a second resistor 224 coupled between the node 219 and an input line 226 coupled to an inverted input 228 of the receiver 223. An output signal $A_{OUT}$ is generated at an output 230.

As will be described in more detail below, additional differential transmitters and differential receivers may be coupled to the nodes of the output resistor divider and the input resistor divider, respectively, to enable transmitting data between the additional differential transmitter and the additional differential receiver using the differential transmission lines associated with other differential transmitter and receiver pairs. That is, by selectively coupling the differential outputs of a differential transmitter to nodes of output resistor divider circuits of other differential transmitters that are coupled to differential transmission lines, and coupling the nodes of input resistor dividers of differential receivers associated with the differential transmission lines to inputs of a differential receiver, as shown for example in FIGS. 7 and 8, fewer differential transmission lines are implemented than differential transmitter and receiver pairs.

Figure 3:
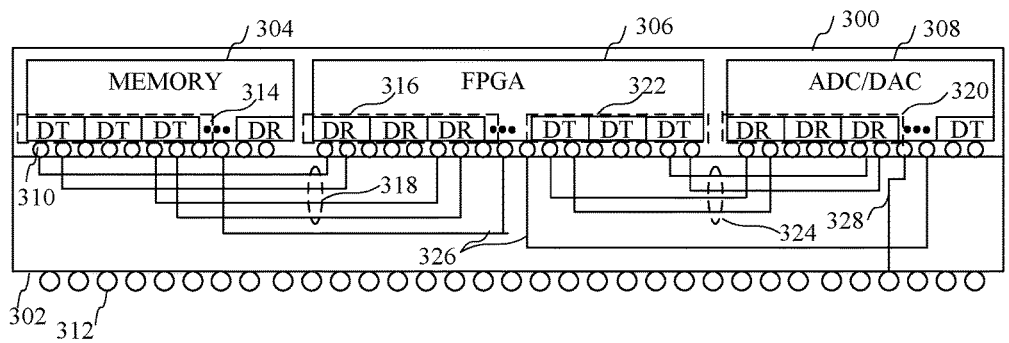
FIG. 3 is a block diagram showing a cross-sectional view of an integrated circuit device having differential transmitters and differential receivers implemented in the integrated circuit die.

Turning now to FIG. 3, a block diagram shows a cross-sectional view of an integrated circuit device having differential transmitters and differential receivers implemented in the integrated circuit die. The integrated circuit 300 of FIG. 3 is a multi-chip module having a substrate 302 adapted to receive a plurality of die, including a memory 304, an FPGA 306 and a ADC/DAC converter chip 308, each of which is electrically connected to contact pads of the substrate by solder bumps 310 or other connective elements. The substrate also includes a plurality of solder balls 312 as shown, or other connective elements, to enable the attachment to a printed circuit board. Each of the die may include a plurality of data transmitters and/or a plurality of data receivers. For example, a plurality of data transceivers 314 may be coupled to a plurality of data receivers 316 by a plurality of pairs of differential transmission lines, shown here as two pairs of differential transmission lines 318. As will be described in more detail below, the three differential transmitters of the plurality of data transceivers 314 and three differential receivers of the plurality of data receivers 316 are configured to transmit data by way of the two pair of differential transmission lines, thereby eliminating a pair of differential transmission lines that would otherwise be needed to transmit data between all three pairs of differential transmitters and differential receivers. A second set of differential transmitters 320 is coupled to a second set of differential receivers 322 by a second plurality of differential transmission lines 324. Other interconnects 326 enable the transfer of signals between different IC die, and interconnects 328 enable the transfer of signals from an IC die to a solder ball 312.

Figure 4:
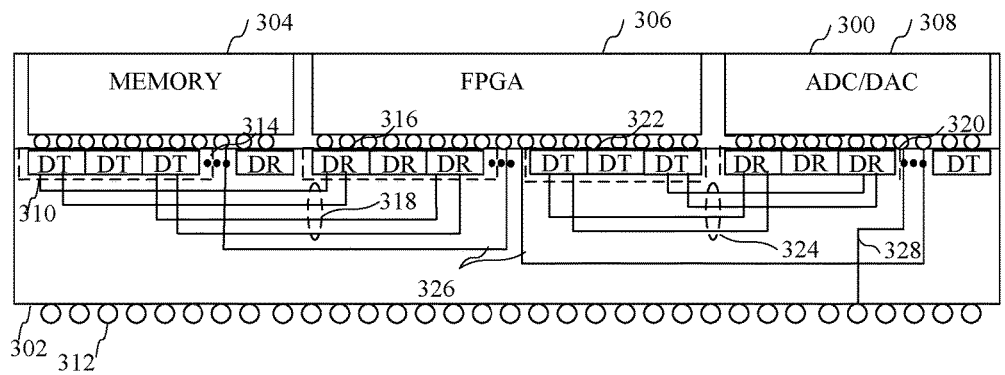
FIG. 4 is a block diagram showing a cross-sectional view of an integrated circuit device having differential transmitters and differential receivers implemented in a substrate.
Figure 5:
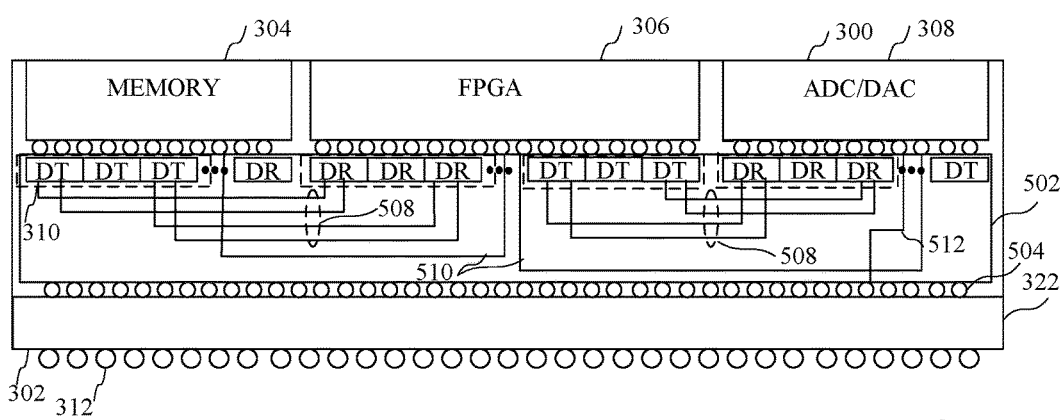
FIG. 5 is a block diagram showing a cross sectional view of an integrated circuit device having differential transmitters and differential receivers implemented in an interposer disposed on the substrate.

Turning now to FIG. 4, a block diagram shows a cross-sectional view of an integrated circuit device having differential transmitters and differential receivers implemented in a substrate. That is, the data transmitters and data receivers are implemented in the substrate 302 rather than in the die themselves. Similarly, as shown in FIG. 5, the differential transmitters and differential receivers are implemented in an interposer 502 disposed on the substrate, where the interposer is coupled to the substrate 302 by solder bumps 504. The interposer 502 provides additional functionality and flexibility to route data between die of the integrated circuit package by way of interposer interconnect elements 506, 508, 510, and 512 corresponding to the substrate interconnect elements 318, 324, 326 and 328, respectively. While a specific number of differential transmitters and differential receivers are shown in different die of the integrated circuit package, it should be understood that the arrangements of elements of FIGS. 3-5 are provided by way of example, and that other arrangements having different numbers of pairs of differential transmitters and differential receivers could be implemented, as will be described in more detail below.

Figure 6:
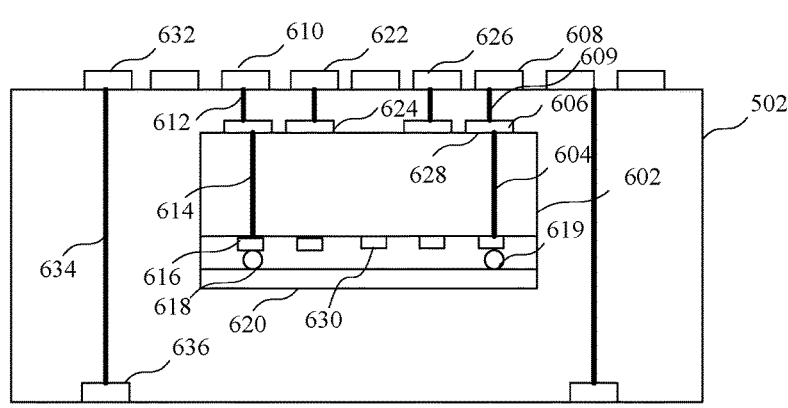
FIG. 6 is a block diagram of a differential receiver implemented in a substrate or interposer of the integrated circuit.

Turning now to FIG. 6, a block diagram of a differential receiver which may be implemented in a substrate or interposer of the integrated circuit is shown, where the particular implementation of FIG. 6 shows a differential receiver implemented in an interposer. While FIG. 6 shows a differential receiver implemented in an interposer, it should be understood that a differential transmitter could be implemented in substrate or interposer in a similar manner. A differential receiver 602 has an interconnect element 604 coupled to a contact 606, which is coupled to a contact pad 608 by way of an interconnect element 609. A second contact pad 610 is coupled by way of an interconnect element 612 of the interposer 502 to an interconnect element 614. A connection can be made from the interconnect element 614 to a contact pad 616, which is coupled by a solder bump 618 to a ground plane 620, for example.

Input and output elements of the differential receiver 602 are also accessed by way of elements of the interposer. More particularly, a contact pad 622 of the interposer is coupled to a first input contact pad 624 of the differential receiver 602, while a second contact pad 626 of the interposer is coupled to a second input contact pad 628 of the differential receiver. An output of the differential receiver can be generated at the contact 630. Interconnect elements may also be transmitted through the interposer. The contact 630 may be coupled by other interconnect elements of the interposer to another die. A first contact element 632 on a first side of the interposer may be coupled by way of an interconnect element 634 to a second contact element 636 on a second side of the interposer.

Figure 7:
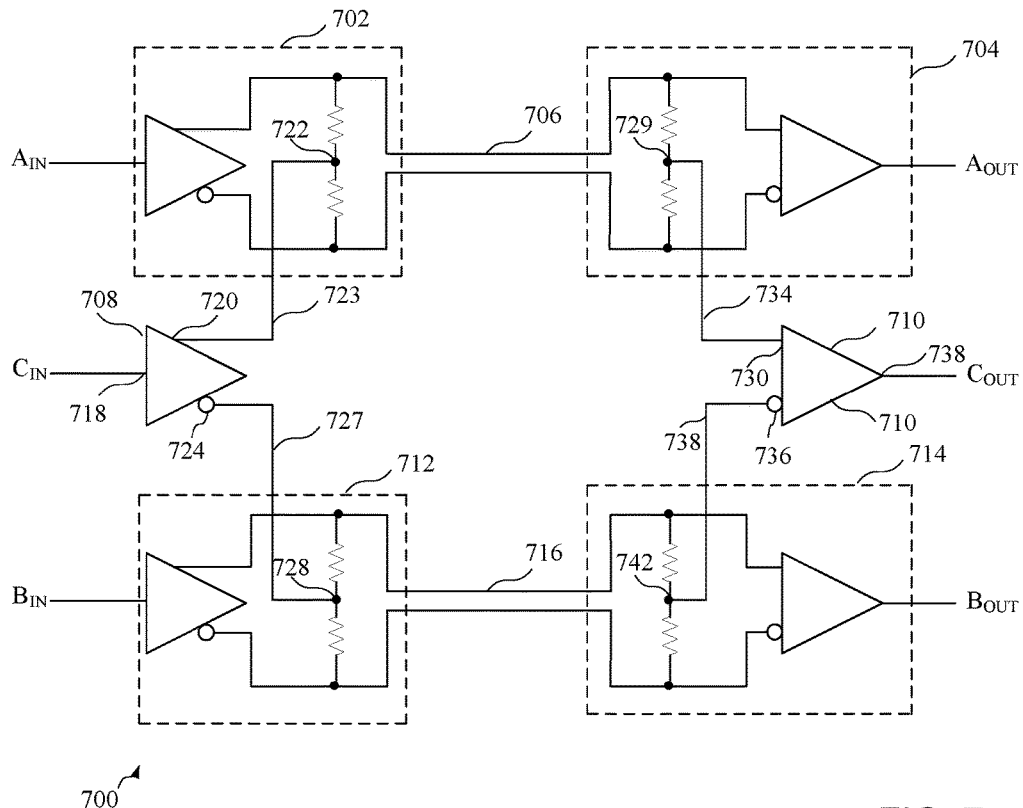
FIG. 7 is a block diagram of an arrangement of differential transmitters and differential receivers enabling the transmission of differential data over differential transmitter and receiver pairs.

Turning now to FIG. 7, a block diagram of an arrangement 700 of differential transmitters and differential receivers enabling the transmission of differential data over a fewer number of differential transmission line pairs than the number of differential transmitter and receiver pairs is shown. In particular, three differential transmitter and differential receiver pairs are included and configured to transmit data using only two differential transmission line pairs. As shown in FIG. 7, a first differential transmitter and differential receiver pair comprises a differential transmitter 702 and a differential receiver 704 coupled together by differential transmission lines 706, as described above in reference to FIG. 2. A second differential transmitter and receiver pair comprises a differential transmitter 708 and a differential receiver 710. A third differential transmitter and differential receiver pair comprises a differential transmitter 712 and a differential receiver 714 coupled together by differential transmission lines 716, as also described above in reference to FIG. 2.

While the second differential transmitter and receiver pair does not include a differential transmission line implemented between them, data generated at the output of the differential transmitter is coupled to a node of a resistor divider of another differential transmitter, and data received at an input of a differential receiver is received by way of a node of a resistor divider of another differential receiver. More particularly, the differential transmitter 708 is coupled to receiver a third input $C_{IN}$ at an input 718, where a first output 720 is coupled to a node 722 of the resistor divider by way of an interconnect element 723 and a second output generated at the inverted output 724 is coupled by an interconnect element 727 to a node 728. Similarly, data generated at a node 729 of the resistor divider of the differential receiver 704 is provided to an input 730 of the differential receiver 710 by way of an interconnect element 734. Data generated at a node 742 of a resistor divider of differential receiver 714 is coupled to an inverted input 736 by way an interconnect element 738. An output signal Cout is generated at an output 740.

The differential transmitter and receiver pairs having differential transmission lines between them enable the implementation of conventional differential signaling channels. Each transmitter and receiver includes resister divider operating as center-tapped terminators. The center taps do not affect the operation of the A and B channels, and in the absence of the circuitry associated with the C circuitry, the center taps of all terminations resistors would be at a fixed voltage which is the common-mode voltage, Vcm, of the signaling system. Data associated with the C channel is transmitted by way of the differential transmission lines associated with the A and B channels. More particularly, the differential $C_{IN}$ data generated at the nodes 722 and 728 is transmitted to nodes 729 and 742 by way of the differential transmission lines 706 and 716, respectively. The C channels transmitter establishes a voltage difference between Vcm on the "A" channel and Vcm on the B channel. This voltage difference propagates down the two transmission channels A and B.

In operation, the transmission of the $A_{IN}$ and $B_{IN}$ data is based upon the voltages at the outputs of the differential transmitters 702 and 712, respectively. For example, a logical zero would be transmitted by the differential transmitter 702 or 712 by transmitting voltages on the differential transmission lines 706 and 716 having a more positive voltage on the lower transmission line compared to the upper transmission line. A logical one would be transmitted by the differential transmitter 702 or 712 by transmitting voltages on the differential transmission lines 706 and 716 having a more positive voltage on the upper transmission line compared to the lower transmission line. By way of example, the differential voltage between the lower transmission line and the upper transmission line could be approximately 200 millivolts near approximately 1.2 volts. The $C_{IN}$ data is transmitted by way of the differential transmission lines 706 and 716 to create a voltage differential between the nodes 729 and 742, independent of the $A_{IN}$ and $B_{IN}$ data transmitted on the differential transmission lines 706 and 716. That is, a differential voltage created at the outputs 720 an 724 and therefore at the nodes 722 and 728 will be detected at the nodes 729 and 742. For example, a more positive voltage generated at node 722 relative to node 728 will be generated at node 729 relative to the voltage at node 742, regardless of the transmission of the $A_{IN}$ and $B_{IN}$ data. Because the voltage differential between the inputs to the differential receivers 704 and 714 will always be the same regardless of whether a logical zero or a logical one is transmitted, a more positive voltage on either node 722 or node 728 can be detected on node 729 or 742. That is, any change to the voltage an node 722 or node 728 will not change the differential voltage between the outputs of the differential transmitters (and received by the differential receivers), but can be detected at the nodes 729 and 742 regardless of whether a logic one or zero is transmitted on either differential transmission line 706 or 716. The differential voltages could be implemented according to the LVDS standard, which is + and −200 mV difference around at approximately 1.2 v. If $A_{IN}$ alone (i.e. no C circuit) were 1, that would be 1.4 v and 1.0 v for example. The addition of the phantom C circuit will cause the A and B buses to now have an additional swing, as C adds or subtracts from both equally. Thus the common mode, and the range (excursion) varies more than before, so the comparators would account for that. In the example above, with a=b=c=1 v, that is 1.6 v and 1.2 v on A and B pairs, as opposed to 1.4 v and 1.2 v if C were not included. The differential transmitters and differential receivers of FIG. 7 could be implemented at any location as described in reference to FIGS. 3-5.

Figure 8:
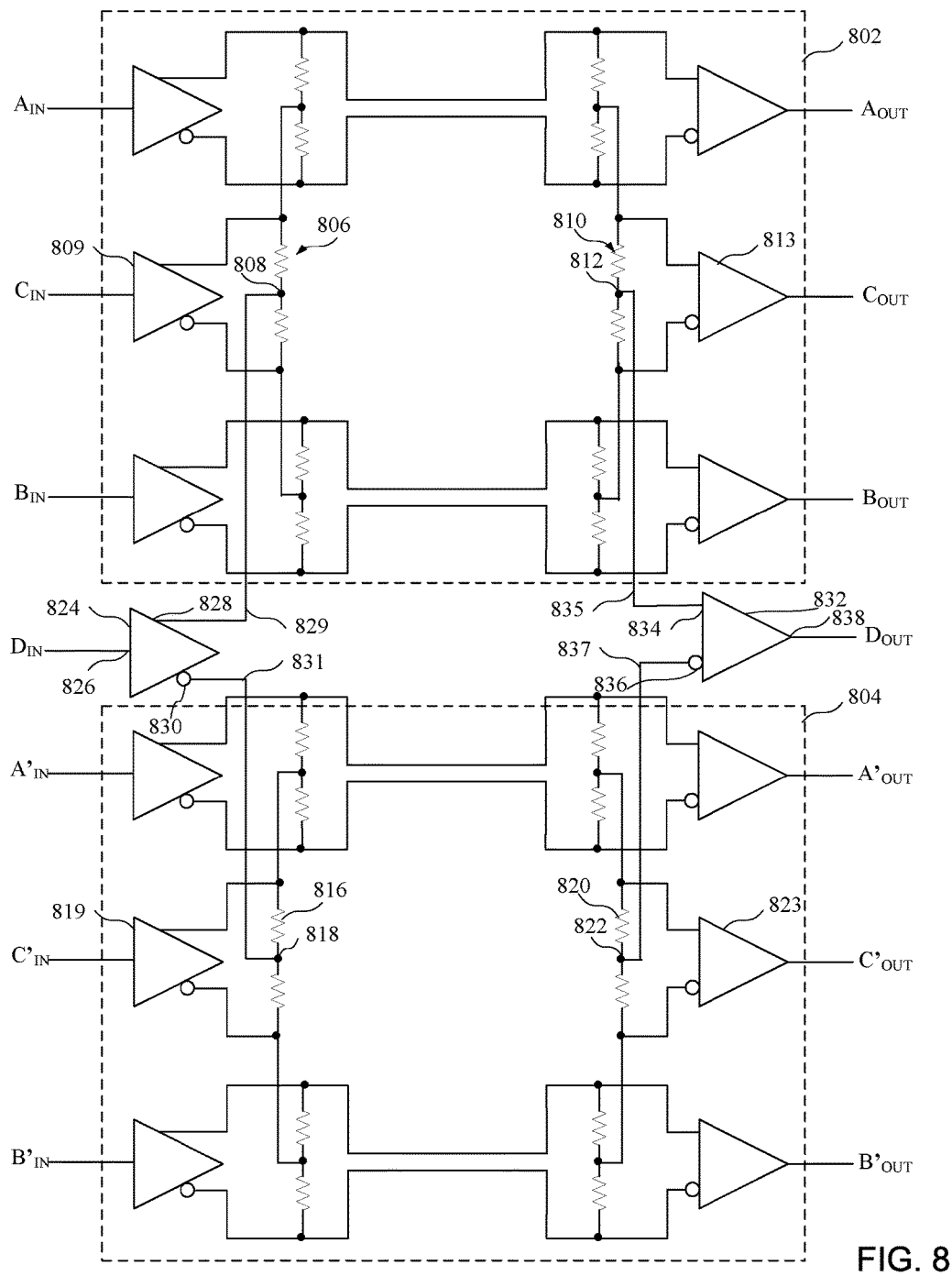
FIG. 8 is another block diagram of an arrangement of differential transmitters and differential receivers enabling the transmission of differential data differential transmitter and receiver pairs.

Turning now to FIG. 8, another block diagram of an arrangement of differential transmitters and differential receivers enabling the transmission of differential data over a fewer number of differential transmission line pairs than the number of differential transmitter and receiver pairs is shown. According to the implementation of FIG. 8, the circuit 702 of FIG. 7 is implemented twice (i.e. as circuits 802 and 804), where a resistor divider is implemented for each of the differential transmitter and receiver pairs that does not have a differential transmitter line between them. That is, for the middle differential transmitter and differential receiver pair of the circuit 802 and the circuit 804, an output resistor divider is provided between the outputs of the differential transmitter and an input resistor divider is provided between the input of the differential receiver. More particularly, an output resistor divider 806 having a node 808 is provided between the outputs of the differential transmitter 809, and an input resistor divider 810 having a node 812 is provided to the inputs of the differential receiver 813. Similarly, an output resistor divider 816 having a node 818 is provided between the output of the differential transmitter 819, and an input resistor divider 820 having a node 822 is provided to the input nodes of the differential receiver 823.

An additional differential transmitter 824 is implemented and receives an input $D_{IN}$ at an input 826 and has a first output 828 coupled to the node 808 by way of an interconnect element 829. An output generated at an inverted output node 830 is coupled to the node 818 by way of the interconnect element 831. An additional differential receiver 832 comprises an input 834 coupled to the node 812 by way of an interconnect element 835, and an inverted input node 836 coupled to the node 822 by way of the interconnect element 837. The received data is generated at an output 838. Accordingly, seven data streams can be transmitted by way of four differential transmission line pairs. The arrangement of FIGS. 7 and 8 can be implemented as described in the integrated circuit devices of FIGS. 3-5, for example, or other suitable integrated circuit packages.

Figure 9:
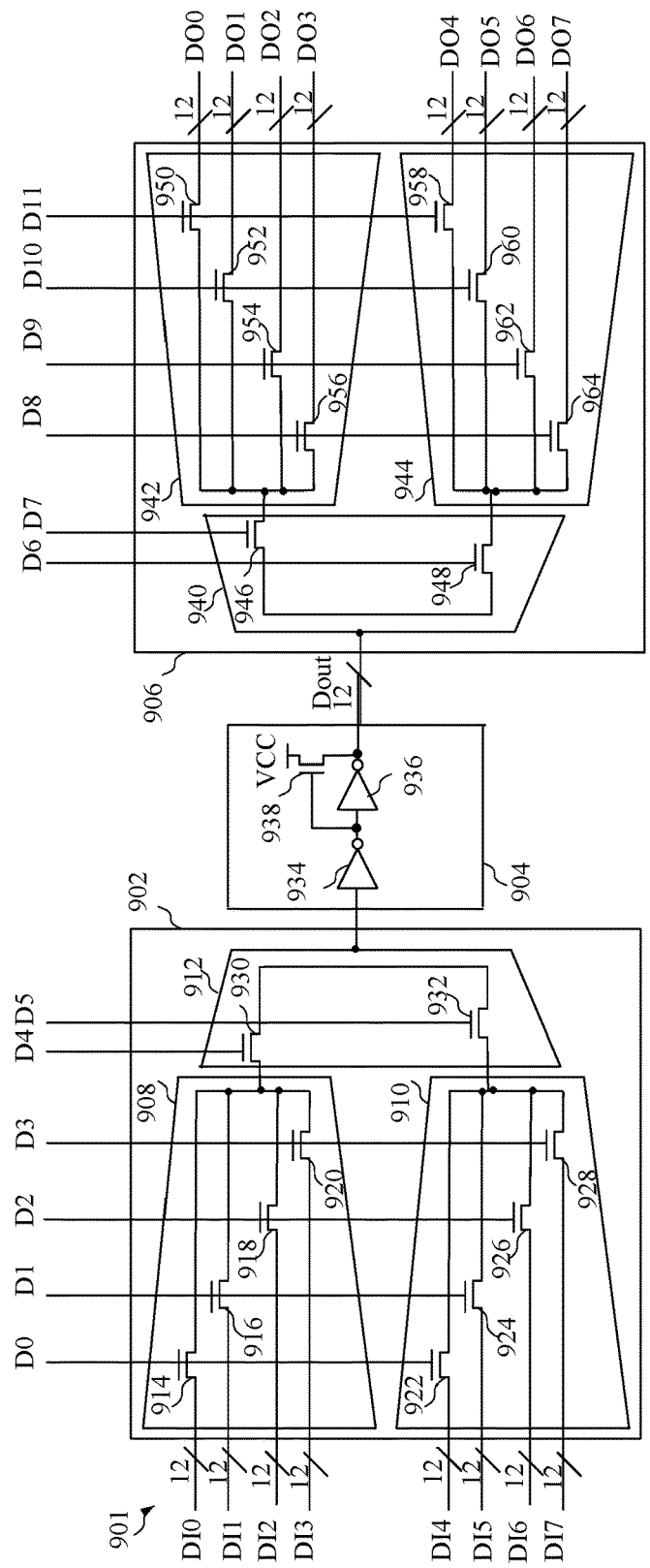
FIG. 9 is a block diagram of a programmable interconnect element enabling the routing of signals to differential data transmitters and from differential data receivers.

Turning now to FIG. 9, a block diagram of a programmable interconnect element 901 enabling the routing of signals to differential data transmitters and from differential data receivers is shown. The multiplexing circuit 902 comprises stages of multiplexers including multiplexers 908 and 910 in a first stage and a multiplexer 912 in a second stage. The multiplexer circuit 902 as shown receives 8 digital input signals DI0-DI7 which may be selected to be coupled to output buffer 904. The multiplexer 908 comprises a transistor 914 for receiving the input DI0, a transistor 916 for receiving the input DI1, a transistor 918 for receiving the input DI2, and a transistor 920 for receiving the input DI3. Similarly, the multiplexer 910 comprises a transistor 922 for receiving the input DI4, a transistor 924 for receiving the input DI5, a transistor 926 for receiving the input DI6, and a transistor 928 for receiving the input DI7. The multiplexer 912 comprises a first transistor 930 enabling routing the output of the multiplexer 908 and a second transistor 932 enabling routing the output of the multiplexer 910.

The output buffer 904 comprises and inverter 934 and an inverter 936. A transistor 938 is coupled at its gate to the output of the inverter 934 and its source to the output of the inverter 936. The output buffer circuit 904 receives a selected input to the multiplexing circuit 902, and generates an output which is coupled to the demultiplexer circuit 906.

The demultiplexer 906 comprises stages of de-multiplexers including demultiplexer 940 in a first stage and demultiplexers 942 and 944 in a second stage. The demultiplexer circuit 940 receives the output of the buffer circuit 904 at its input and generates an output using transistors 946 and 948. The multiplexer 942 comprises a transistor 950 for generating the output DO0, a transistor 952 for generating the output DO1, a transistor 954 for generating the output DO2, and a transistor 958 for generating the output DO3. Similarly, the demultiplexer 944 comprises a transistor 958 for generating the output DO4, a transistor 960 for generating the output DO5, a transistor 962 for generating the output DO6, and a transistor 964 for generating the output DO7. Accordingly, the programmable interconnect element enables the coupling of data to inputs of any differential transmitter or from outputs of any differential receiver.

Figure 10:
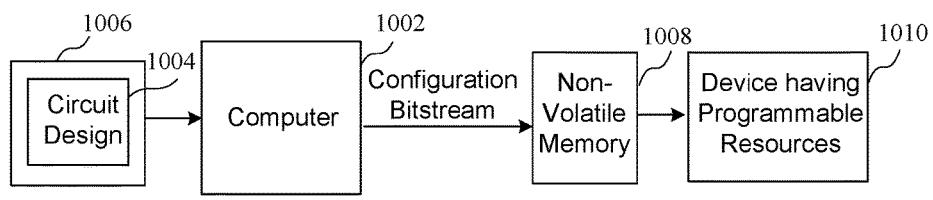
FIG. 10 is a block diagram showing a circuit enabling the configuration of a device having programmable resources.

Turning now to FIG. 10, a block diagram of a system for programming a device having programmable resources according to an embodiment is shown. In particular, a computer 1002 is coupled to receive a circuit design 1004 from a memory 1006, and generates a configuration bitstream that is stored in the non-volatile memory 1008. As will be described in more detail below, the circuit design may be a high level design, such as a circuit design defined in a hardware description language (HDL). Also, the computer may be configured to run software that generates a configuration bitstream that is stored in the non-volatile memory 1008 and provided to an integrated circuit 1010 that may be a programmable integrated circuit, such as the integrated circuit described below in FIG. 11. As will be described in more detail below, bit of the configuration bitstream are used to configure programmable resources of the integrated circuit.

Figure 11:
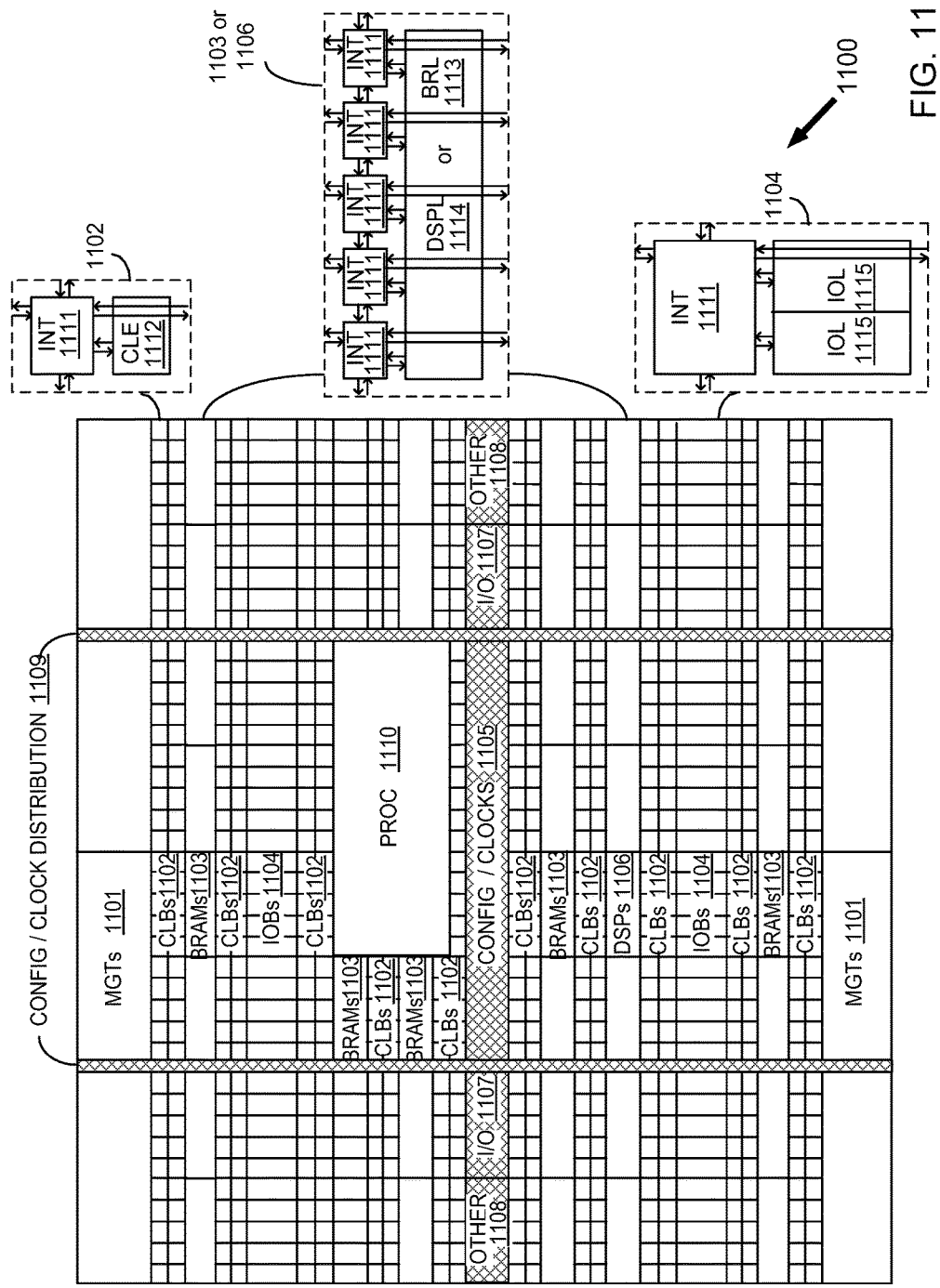
FIG. 11 is a block diagram of a device having programmable resources.

Turning now to FIG. 11, a block diagram of a device having programmable resources including the circuits of FIGS. 1-9 is shown. While devices having programmable resources may be implemented in any type of integrated circuit device, such as an application specific integrated circuit (ASIC) having programmable resources, other devices comprise dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

The device of FIG. 11 comprises an FPGA architecture 1100 having a large number of different programmable tiles including multi-gigabit transceivers (MGTs) 1101, CLBs 1102, random access memory blocks (BRAMs) 1103, input/output blocks (IOBs) 1104, configuration and clocking logic (CONFIG/CLOCKS) 1105, digital signal processing blocks (DSPs) 1106, specialized input/output blocks (I/O) 1107 (e.g., configuration ports and clock ports), and other programmable logic 1108 such as digital clock managers, analog-to-digital converters, system monitoring logic, and so forth. Some FPGAs also include dedicated processor blocks (PROC) 1110, which may be used to implement a software application, for example.

In some FPGAs, each programmable tile includes a programmable interconnect element (INT) 1111 having standardized connections to and from a corresponding interconnect element in each adjacent tile. Therefore, the programmable interconnect elements taken together implement the programmable interconnect structure for the illustrated FPGA. The programmable interconnect element 1111 also includes the connections to and from the programmable logic element within the same tile, as shown by the examples included at the top of FIG. 11.

For example, a CLB 1102 may include a configurable logic element (CLE) 1112 that may be programmed to implement user logic plus a single programmable interconnect element 1111. A BRAM 1103 may include a BRAM logic element (BRL) 1113 in addition to one or more programmable interconnect elements. The BRAM includes dedicated memory separate from the distributed RAM of a configuration logic block. Typically, the number of interconnect elements included in a tile depends on the height of the tile. In the pictured embodiment, a BRAM tile has the same height as five CLBs, but other numbers may also be used. A DSP tile 1106 may include a DSP logic element (DSPL) 1114 in addition to an appropriate number of programmable interconnect elements. An IOB 1104 may include, for example, two instances of an input/output logic element (IOL) 1115 in addition to one instance of the programmable interconnect element 1111. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. The config/clock distribution regions 1109 extending from this column are used to distribute the clocks and configuration signals across the breadth of the FPGA. Some FPGAs utilizing the architecture illustrated in FIG. 11 include additional logic blocks that disrupt the regular columnar structure making up a large part of the FPGA. The additional logic blocks may be programmable blocks and/or dedicated logic. For example, the processor block PROC 1110 shown in FIG. 11 spans several columns of CLBs and BRAMs.

Note that FIG. 11 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 11 are purely exemplary. For example, in an actual FPGA more than one adjacent column of CLBs is typically included wherever the CLBs appear in order to facilitate the efficient implementation of user logic. While the embodiment of FIG. 11 relates to an integrated circuit having programmable resources, it should be understood that the circuits and methods set forth in more detail below could be implemented in any type of ASIC.

Figure 12:
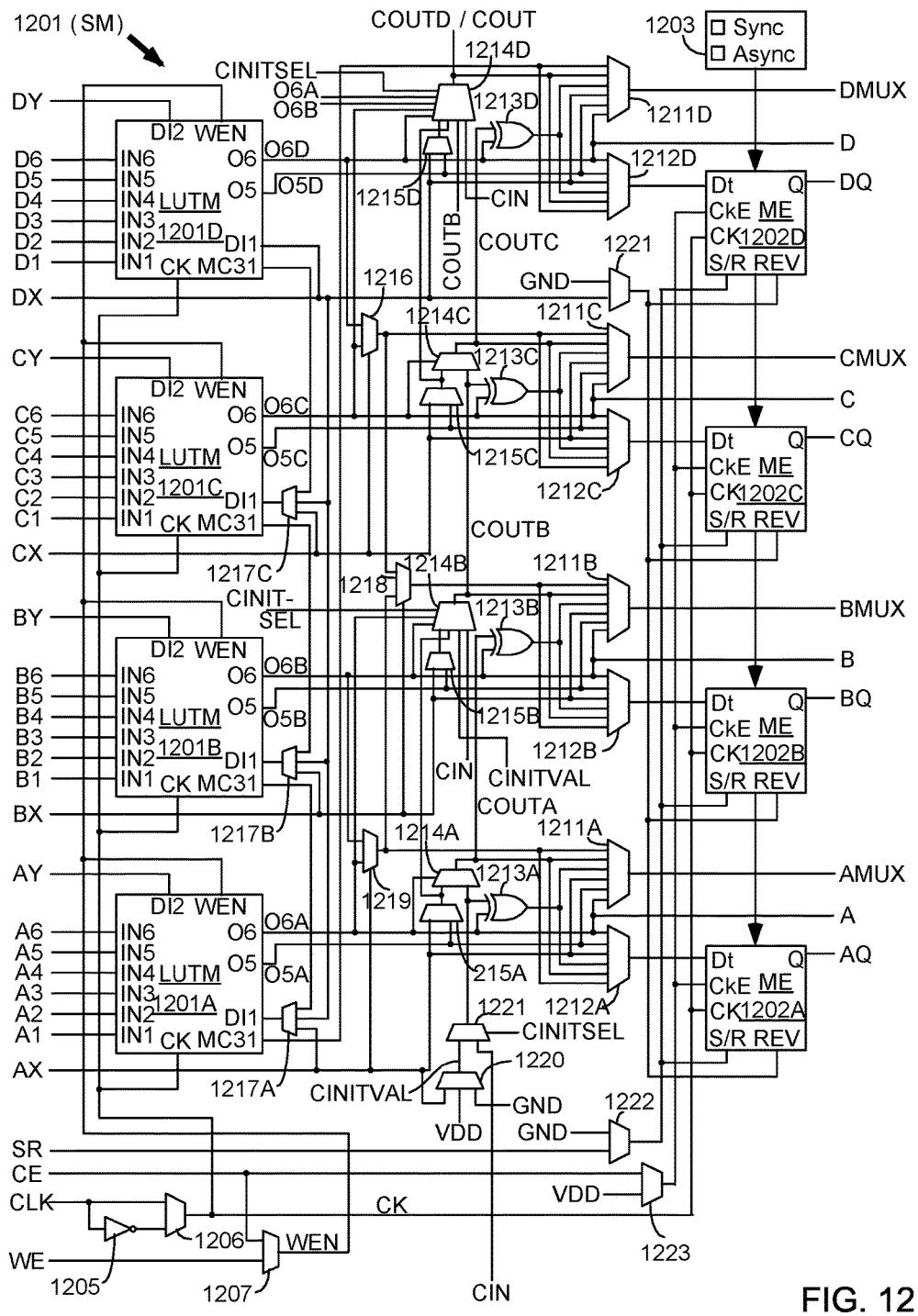
FIG. 12 is a block diagram of configurable logic element of the device of FIG. 11.

Turning now to FIG. 12, block diagram of a configurable logic element of the device of FIG. 11 is shown. In particular, FIG. 12 illustrates in simplified form a configurable logic element of a configuration logic block 1102 of FIG. 11. In the embodiment of FIG. 12, slice M 1201 includes four lookup tables (LUTMs) 1201A-1201D, each driven by six LUT data input terminals A1-A6, B1-B6, C1-C6, and D1-D6 and each providing two LUT output signals O5 and O6. The O6 output terminals from LUTs 1201A-1201D drive slice output terminals A-D, respectively. The LUT data input signals are supplied by the FPGA interconnect structure via input multiplexers, which may be implemented by programmable interconnect element 1211, and the LUT output signals are also supplied to the interconnect structure. Slice M also includes: output select multiplexers 1211A-1211D driving output terminals AMUX-DMUX; multiplexers 1212A-1212D driving the data input terminals of memory elements 1202A-1202D; combinational multiplexers 1216, 1218, and 1219; bounce multiplexer circuits 1222-1223; a circuit represented by inverter 1205 and multiplexer 1206 (which together provide an optional inversion on the input clock path); and carry logic having multiplexers 1214A-1214D, 1215A-1215D, 1220-1221 and exclusive OR gates 1213A-1213D. All of these elements are coupled together as shown in FIG. 12. Where select inputs are not shown for the multiplexers illustrated in FIG. 12, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 12 for clarity, as well as from other selected figures herein.

In the pictured embodiment, each memory element 1202A-1202D may be programmed to function as a synchronous or asynchronous flip-flop or latch. The selection between synchronous and asynchronous functionality is made for all four memory elements in a slice by programming Sync/Asynch selection circuit 1203. When a memory element is programmed so that the S/R (set/reset) input signal provides a set function, the REV input terminal provides the reset function. When the memory element is programmed so that the S/R input signal provides a reset function, the REV input terminal provides the set function. Memory elements 1202A-1202D are clocked by a clock signal CK, which may be provided by a global clock network or by the interconnect structure, for example. Such programmable memory elements are well known in the art of FPGA design. Each memory element 1202A-1202D provides a registered output signal AQ-DQ to the interconnect structure. Because each LUT 1201A-1201D provides two output signals, O5 and O6, the LUT may be configured to function as two 5-input LUTs with five shared input signals (IN1-IN5), or as one 6-input LUT having input signals IN1-IN6.

In the embodiment of FIG. 12, each LUTM 1201A-1201D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 1217A-1217C for LUTs 1201A-1201C), or to the two 32-bit RAMs via input terminals DI1 and DI2. RAM write operations in the LUT RAMs are controlled by clock signal CK from multiplexer 1206 and by write enable signal WEN from multiplexer 1207, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 1201A may also be provided to the general interconnect structure for shift register chaining, via output select multiplexer 1211D and CLE output terminal DMUX. Accordingly, the circuits and methods set forth above may be implemented in a device such as the devices of FIGS. 11 and 12, or any other suitable device.

Figure 13:
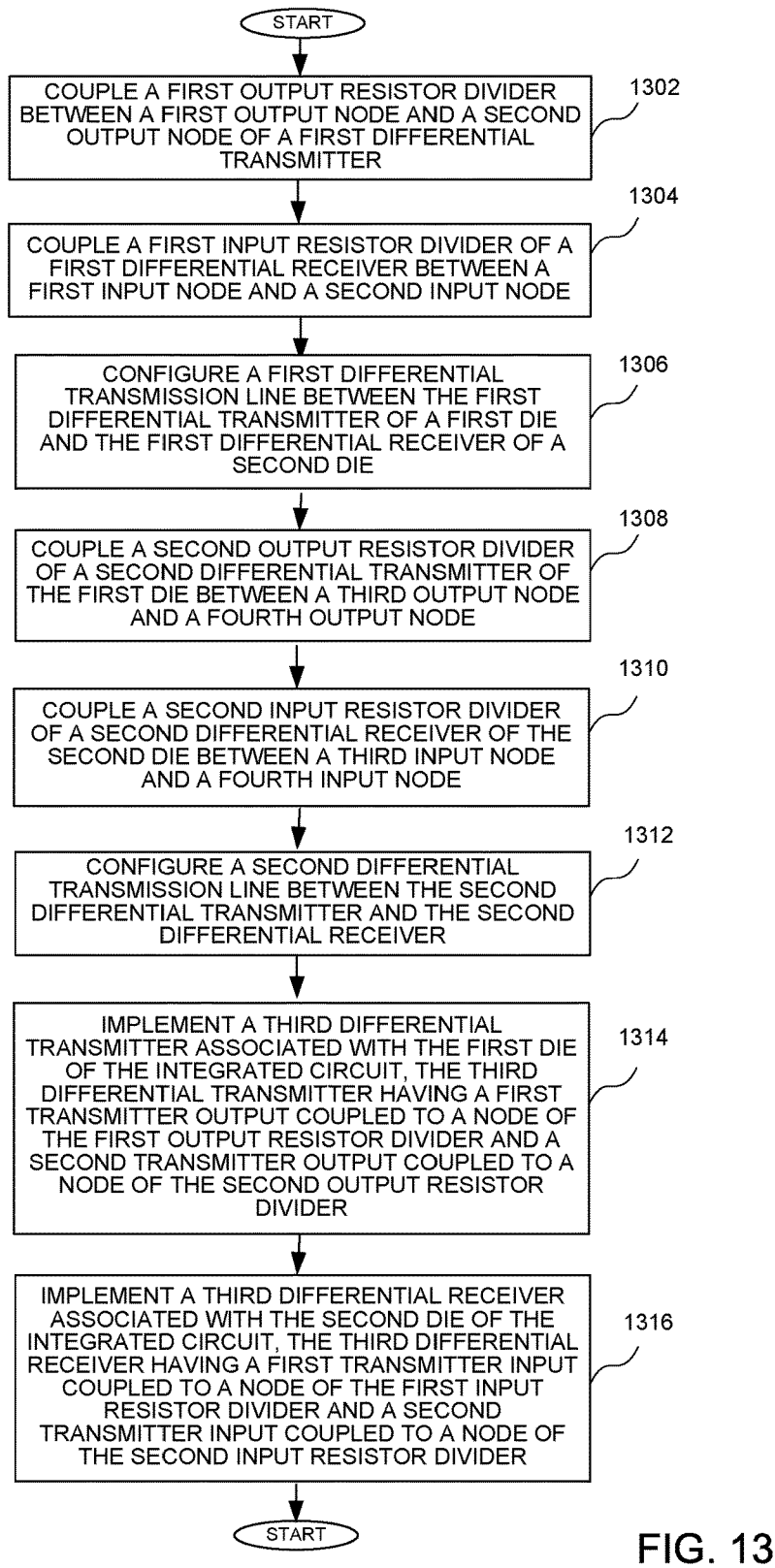
FIG. 13 is a flow chart showing a method of routing data between die of an integrated circuit.

Turning now to FIG. 13, a flow chart shows a method of routing data between die of an integrated circuit. A first output resistor divider is coupled between a first output node and a second output node of a first differential transmitter at a block 1302. A first input resistor divider of a first differential receiver is coupled between a first input node and a second input node at a block 1304. A first differential transmission line is configured between the first differential transmitter of a first die and the first differential receiver of a second die at a block 1306. A second output resistor divider of a second differential transmitter is coupled between a third output node and a fourth output node at a block 1308. A second input resistor divider of the second differential receiver coupled between a third input node and a fourth input node at a block 1310. A second differential transmission line is configured between the second differential transmitter of the first die and the second differential receiver of the second die at a block 1312. A third differential transmitter associated with the first die of the integrated circuit is implemented. The third differential transmitter has a first transmitter output coupled to a node of the first output resistor divider and a second transmitter output coupled to a node of the second output resistor divider at a block 1314. A third differential receiver associated with the second die of the integrated circuit is also implemented. The third differential receiver has a first transmitter input coupled to a node of the first input resistor divider and a second transmitter input coupled to a node of the second input resistor divider at a block 1316. The methods of FIG. 13 could be implemented using any of the circuits of FIGS. 1-12, or any other suitable circuit.

It can therefore be appreciated that new to circuits for and methods of routing data between die an integrated circuit have been described. It will be appreciated by those skilled in the art that numerous alternatives and equivalents will be seen to exist that incorporate the disclosed invention. As a result, the invention is not to be limited by the foregoing embodiments, but only by the following claims.

I claim:

1. A circuit for routing data between die of an integrated circuit, the circuit comprising:
    a first differential transmitter and receiver pair having a first differential transmitter associated with a first die of the integrated circuit and a first differential receiver associated with a second die of the integrated circuit, wherein the first differential transmitter has a first output resistor divider coupled between a first output and a second output and the first differential receiver has a first input resistor divider coupled between a first input and a second input;
    a first differential transmission line coupled between the first differential transmitter and the first differential receiver;
    a second differential transmitter and receiver pair having a second differential transmitter associated with the first die of the integrated circuit and a second differential receiver associated with the second die of the integrated circuit, wherein the second differential transmitter has a second output resistor divider coupled between a third output and a fourth output and the second differential receiver has a second input resistor divider coupled between a third input and a fourth input;
    a second differential transmission line coupled between the second differential transmitter and the second differential receiver;
    a third differential transmitter associated with the first die of the integrated circuit, the third differential transmitter having a fifth transmitter output coupled to a node of the first output resistor divider and a sixth transmitter output coupled to a node of the second output resistor divider; and
    a third differential receiver associated with the second die of the integrated circuit, the third differential receiver having a fifth receiver input coupled to a node of the first input resistor divider and a sixth receiver input coupled to a node of the second input resistor divider.

2. The circuit of claim 1 wherein the third differential transmitter comprises a third output resistor divider, the circuit further comprising a fourth differential transmitter having a first output coupled to a node of the third output resistor divider.

3. The circuit of claim 2 wherein the third differential receiver comprises a third input resistor divider, the circuit further comprising a fourth differential receiver having a first input coupled to a node of the third input resistor divider.

4. The circuit of claim 1 wherein the first, second and third differential transmitters are formed in the first die and the first, second and third differential receivers are formed in the second die.

5. The circuit of claim 1 further comprising a plurality of substrate interconnect elements formed in the substrate, wherein the first, second and third differential transmitters are connected to the first, second and third differential receivers by way of the substrate interconnect elements.

6. The circuit of claim 5 wherein the first, second and third differential transmitters and the first, second and third differential receivers are formed in the substrate.

7. The circuit of claim 1 further comprising an interposer formed on a substrate, wherein the first, second and third differential transmitters and the first, second and third differential receivers are formed in the interposer.

8. The circuit of claim 7 further comprising interposer interconnect elements, wherein the first, second and third differential transmitters are connected to the first, second and third differential receivers by way of the interposer interconnect elements.

9. The circuit of claim 1 further comprising programmable interconnect elements, wherein the programmable interconnect elements enable selectively connecting to outputs of the first, second and third differential transmitters and to inputs of the first, second and third differential receivers.

10. The circuit of claim 1 wherein the first die comprises a memory and the second die comprises a programmable logic device.

11. A method of routing data between die of an integrated circuit, the method comprising:
coupling a first output resistor divider between a first output and a second output of a first differential transmitter associated with a first die;
coupling a first input resistor divider between a first input and a second input of a first differential receiver associated with a second die;
configuring a first differential transmission line between the first differential transmitter and the first differential receiver;
coupling a second output resistor divider between a third output and a fourth output of a second differential transmitter associated with the first die;
coupling a second input resistor divider between a third input and a fourth input of a second differential receiver associated with the second die;
configuring a second differential transmission line between the second differential transmitter and the second differential receiver;
implementing a third differential transmitter associated with the first die of the integrated circuit, the third differential transmitter having a fifth transmitter output coupled to a node of the first output resistor divider and a sixth transmitter output coupled to a node of the second output resistor divider; and
implementing a third differential receiver associated with the second die of the integrated circuit, the third differential receiver having a fifth receiver input coupled to a node of the first input resistor divider and a sixth receiver input coupled to a node of the second input resistor divider.

12. The method of claim 11 wherein implementing the third differential transmitter comprises configuring a third output resistor divider between the fifth output and the sixth output, the method further comprising implementing a fourth differential transmitter having a first output coupled to a node of the third output resistor divider.

13. The method of claim 11 wherein implementing the third differential receiver further comprises configuring a third input resistor divider, the method further comprising configuring a fourth differential receiver having a first input coupled to a node of the third input resistor divider.

14. The method of claim 11 further comprising forming the first, second and third differential transmitters in the first die and forming the first, second and third differential receivers in the second die.

15. The method of claim 11 further comprising configuring a plurality of substrate interconnect elements formed in the substrate, wherein the first, second and third differential transmitters are connected to the first, second and third differential receivers by way of the substrate interconnect elements.

16. The method of claim 15 further comprising implementing the first, second and third differential transmitters and the first, second and third differential receivers in the substrate.

17. The method of claim 11 further comprising implementing an interposer on a substrate, wherein the first, second and third differential transmitters and the first, second and third differential receivers are formed in the interposer.

18. The method of claim 11 further comprising configuring interposer interconnect elements, wherein the first, second and third differential transmitters are connected to the first, second and third differential receivers by way of the interposer interconnect elements.

19. The method of claim 11 further comprising implementing programmable interconnect elements, wherein the programmable interconnect elements enable selectively connecting outputs of the first, second and third differential transmitters to inputs of the first, second and third differential receivers.

20. The method of claim 11 wherein the first die comprises a memory and the second die comprises a programmable logic device.

* * * * *